United States Patent [19]

Iwasaki

[11] Patent Number: 5,036,621
[45] Date of Patent: Aug. 6, 1991

[54] SLIDING MEMBER FOR WINDOW REGULATOR

[75] Inventor: Kenji Iwasaki, Nishinomiya, Japan
[73] Assignee: Nippon Cable System Inc., Takarazuka, Japan
[21] Appl. No.: 551,377
[22] Filed: Jul. 11, 1990

[30] Foreign Application Priority Data

Jul. 17, 1989 [JP] Japan .............................. 64-83889[U]

[51] Int. Cl.⁵ .............................................. E05D 15/16
[52] U.S. Cl. ...................................... 49/428; 16/93 R; 49/348; 49/375
[58] Field of Search ................. 49/428, 348, 349, 350, 49/351, 352, 375, 374, 440, 502; 16/93 R

[56] References Cited

U.S. PATENT DOCUMENTS

| | | | |
|---|---|---|---|
| 3,466,803 | 9/1969 | Packett | 49/428 X |
| 4,069,617 | 1/1978 | Koike | 49/428 |
| 4,503,639 | 3/1985 | Rossie et al. | 49/348 X |
| 4,782,629 | 11/1988 | Mori et al. | 49/428 |
| 4,829,630 | 5/1989 | Church et al. | 49/428 X |

FOREIGN PATENT DOCUMENTS

2624028 12/1976 Fed. Rep. of Germany .
2836032 2/1980 Fed. Rep. of Germany .
8413286 6/1987 Fed. Rep. of Germany .
1447576 8/1976 United Kingdom .

Primary Examiner—Philip C. Kannan
Attorney, Agent, or Firm—Armstrong, Nikaido, Marmelstein, Kubovcik, & Murray

[57] ABSTRACT

A sliding member for a window regulator having a substantially vertical guide rail lip channel cross sectional shape. The sliding member is capable of sliding internally of the guide rail. A carrier plate has a shaft to support the sliding member and fixedly supports a window pane. The sliding member has a rigid body with guided surfaces facing to the guide rail and has protrusions made of elastic material which slidably contact the guide rail. The protrusions are located on a part of the guided surfaces of the sliding member. The sliding member minimizes pivotal instability of the carrier plate during sliding movement of the window pane.

3 Claims, 5 Drawing Sheets

SLIDING MEMBER FOR WINDOW REGULATOR

BACKGROUND OF THE INVENTION

The present invention relates to an improvement of a sliding member for a window regulator, and more particularly to an improvement of a sliding member capable of minimizing an instability of a sliding member relative to a guide rail.

With regard to a conventional window regulator which moves up and down a window pane for vehicles or the like by sliding to open or shut the window, there is employed for example a regulator having a construction in which a steel guide rail having a "lip channel steel" cross sectional shape (both sides are twice bent inwardly) is used and a sliding member capable of sliding along the inside of the guide rail is attached to a carrier plate.

The bending of the guide rail having the above-mentioned cross sectional shape is easy compared with guide rails having different cross sectional shape, so the guide rail having the above-mentioned cross sectional shape is widely used for a window regulator which needs to make a window pane slide along a three dimensional locus. In order that the carrier plate to which a window pane is attached can slide along the guide rail having the above-mentioned construction, the carrier plate is equipped with a pivotally attached sliding member made of metal or relatively hard synthetic resin to allow the guide plate to slide along the guide rail.

With regard to the conventional sliding member for a window regulator, metal or relatively hard thermoplastic resin (polyacetal or the like) is generally employed as the material to be used for the member. On the other hand, in another example of the conventional window regulator, a comparatively hard but elastic material, such as polyurethane, is used and its elasticity is effectively utilized.

The former sliding member is hardly bent even when a heavy load is applied onto it during sliding movement in the guide rail, so it can stand under a heavy load. However, a clearance to ensure a smooth initial sliding movement is required between the sliding member and the guide rail, though the required clearance is very small. This clearance causes a pivotal instability of the carrier plate supporting the window pane during its sliding movement, and thus there arises an inconvenience problem in the opening and shutting operation of the window pane.

On the other hand, the latter sliding member made of elastic polyurethane or the like does not cause a play initially in the sliding movement, but it has a drawback that a deformation takes place and consequently a pivotal instability of the carrier plate takes place when a heavy load is applied onto it.

Thus, the former and the latter respectively have both a merit and a demerit.

In this specification, the term "pivotal instability" is defined as follows (refer to FIG. 7):

$$\text{Pivotal Instability} = \frac{\text{lateral deflection of one sliding member}}{\text{span between two sliding member}}$$

An object of the present invention is to provide a sliding member capable of suppressing a pivotal instability at the initial sliding movement and another pivotal instability caused by undesired deformation under a heavy load to a minimum load.

SUMMARY OF THE INVENTION

There is provided in accordance with the present invention a sliding member for a window regulator which includes: a guide rail having a channel-with-lip type cross sectional shape disposed substantially vertical, a sliding member capable of sliding along an inside of the guide rail, a carrier plate onto which the sliding member is attached and a window pane is fixed, and a driving means for enabling the carrier plate to slide up and down along the guide rail, characterized in that the sliding member has a rigid body having a guided surface facing to the guide rail and at least one protrusion made of elastic material which contacts the guide rail slidably and the protrusion is located on a part of the guided surface preferably in such a manner that the protrusion prevents the rigid body from sliding directly on the guide rail under light load conditions. The term "light load", described here, means a load applied on a sliding member, for example, when a window regulator is at rest, or, at an initial sliding movement.

Preferably, the sliding member may have a rectangular side face configuration, and optionally may have additional protrusions made of elastic material on a part of both side faces preferably in such a manner that the additional protrusions prevent the rigid body from sliding directly on the guide rail under light load conditions.

Alternatively, the sliding member may have a roller-like or round shaped side face and an annular protrusion made of elastic material on the outside circumferential surface covering the full circumferential length, or, as occasion demands, may have additional ring-like protrusions made of elastic material on a part of both side faces of the sliding member which have a roller-like or round shaped configuration in such a manner that the protrusions prevent the rigid body from sliding on the guide rail.

In this specification, the term "side face" of the slidable member means a surface which is substantially parallel to the window pane and the carrier plate.

In a window regulator using the sliding member according to the present invention, any instability of the slidable member is not noticed even in the initial slidable movement of a window pane because the protrusion made of elastic material such as polyurethane is set to or contacts a part of the guided surface. Furthermore, the rigid body of the sliding member is made of relatively hard metal or thermoplastic resin, so it is hardly deformed and consequently the undesirable pivotal instability is minimized even under a heavy load applied occasionally.

DETAILED DESCRIPTION

The sliding member for a window regulator according to the present invention is explained below with reference to the drawings.

Figure 1:
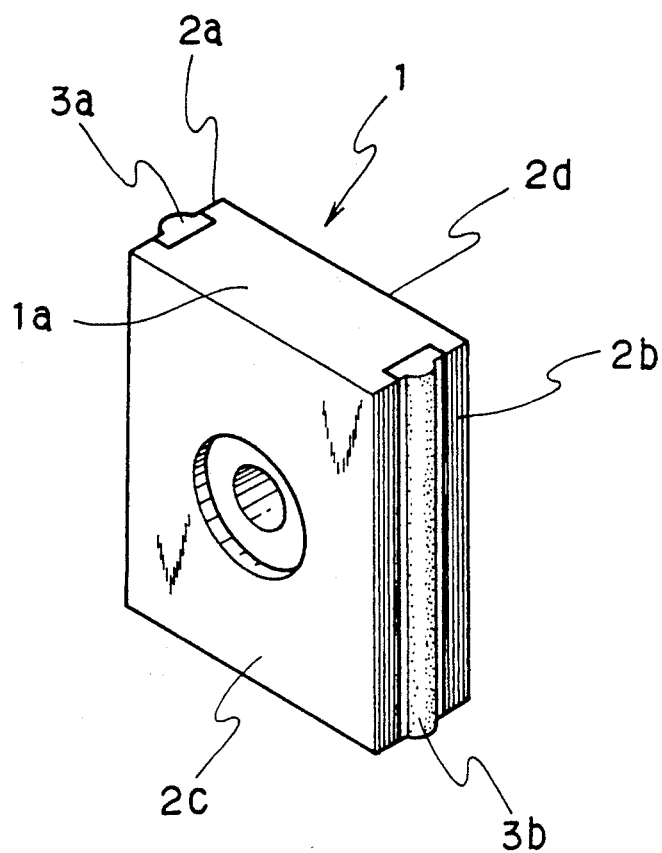
FIG. 1 is a perspective view showing an embodiment of the sliding member having a side face of rectangular shape according to the present invention.

In FIG. 1, a sliding member 1 has a construction in which there is provided, on a rigid body 1a, protrusions 3a, 3b made of relatively hard elastic material such as polyurethane slidably contacting the guide rail at locations on both guided surface 2a, 2b facing the guide rail of the sliding member 1.

Figure 2:
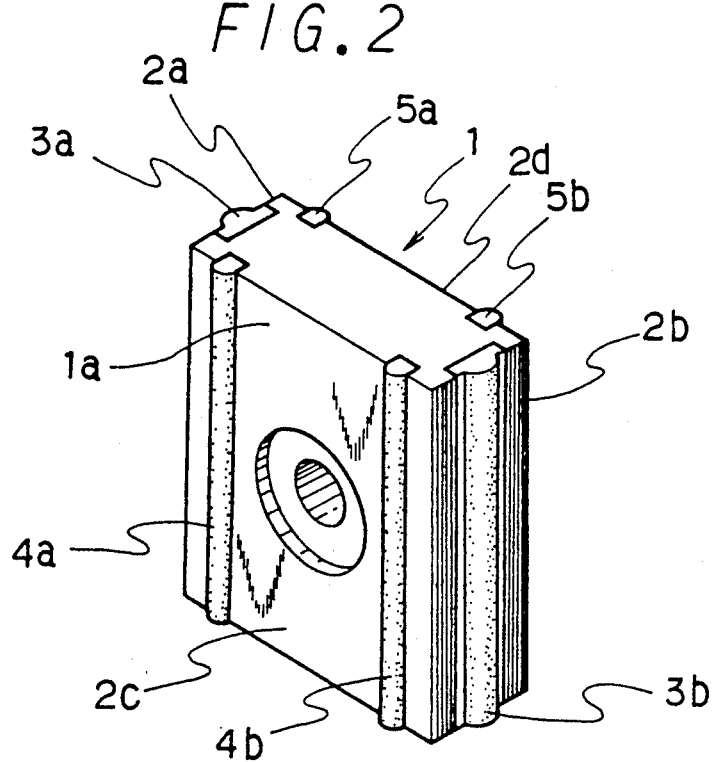
FIG. 2 is a perspective view showing another rectangular embodiment different from the embodiment shown in FIG. 1.

Further, a sliding member 1 in FIG. 2 has a construction in which there is provided on a rigid body 1a, in addition to the construction shown in FIG. 1, protrusions 4a, 4b, 5a, 5b made of relatively hard elastic material such as polyurethane for slidably contacting the guide rail at locations on different guided surfaces (or side faces) 2c, 2d of the slidable member 1.

Using the sliding member of the present invention having the above-mentioned construction, a pivotal instability test is carried out to compare the sliding member according to the present invention with the conventional ones. The test result is shown by means of a graph in FIG. 6.

As previously mentioned, during the sliding movement of the window pane the protrusions 3a, 3b made of elastic material such as polyurethane are in contact with the guide rail. Therefor, as demonstrated in the graph of FIG. 6 almost no pivotal instability is observed at the initial sliding movement by virtue of the characteristics of the sliding member made of elastic material (polyurethane).

Further, when a heavy load is applied to the window pane, the protrusions 3a, 3b having elasticity are so completely deformed that the rigid body 1a made of relatively hard thermoplastic resin (polyacetal or the like) of the sliding member 1 is allowed to be in direct contact the guide rail at regions without the elastic L protrusions 3a, 3b. As a result, there is not observed a pivotal instability of the carrier plate caused by an undesired deformation of the sliding member.

Thus, in accordance with the particular combination of two conventional sliding members, there can be obtained a meritorious novel sliding member having only the merits or advantages of both types of conventional sliding members.

Figure 6:
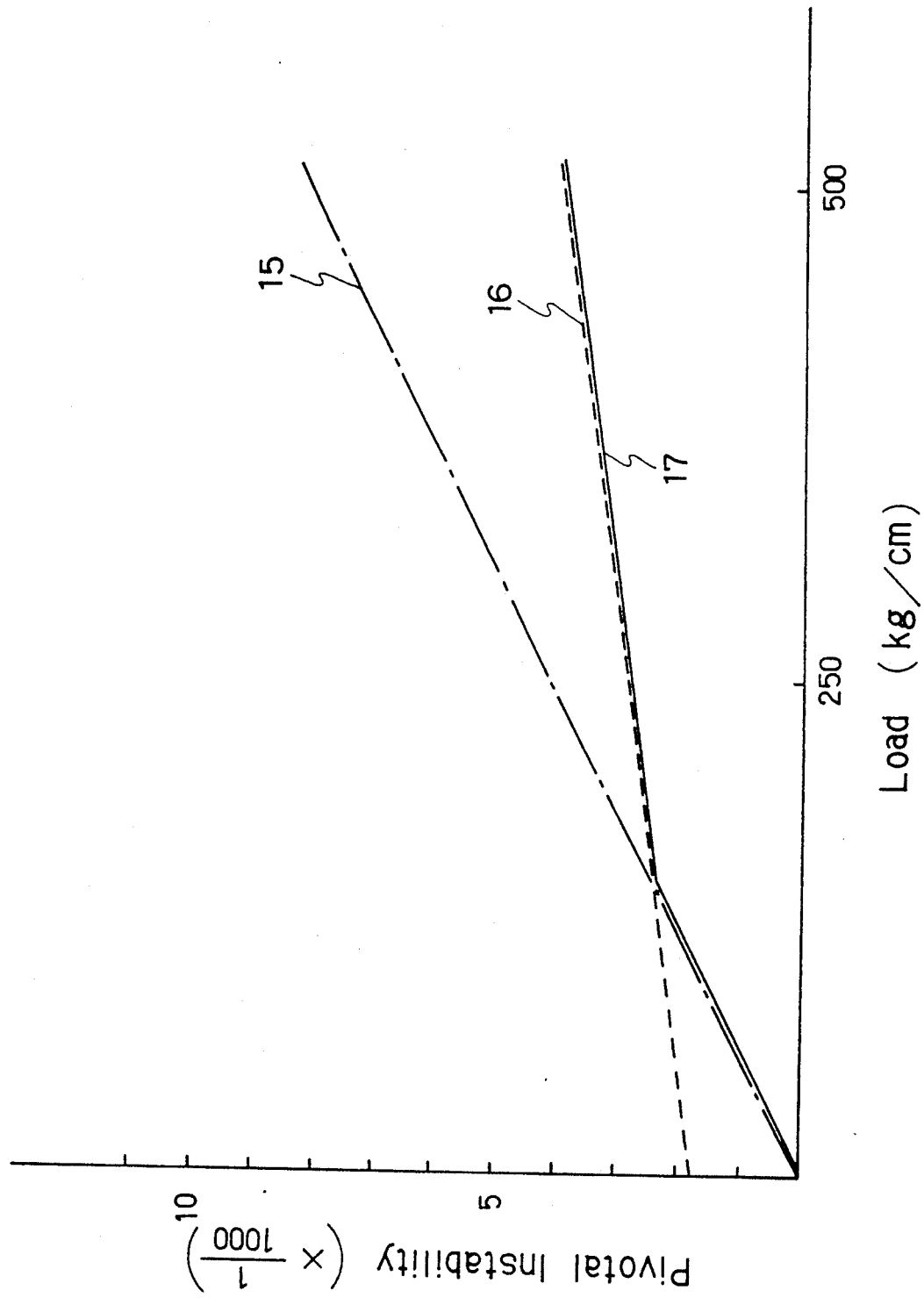
FIG. 6 is a graph showing the pivotal instability test result of the sliding member according to the present invention.

In FIG. 6, the pivotal instability test data of the conventional sliding member made of polyurethane is represented by the line 15, the data of the conventional sliding member made of polyacetal is represented by the line 16 and the data of the sliding member of the present invention is represented by the line 17 respectively.

Figure 7:
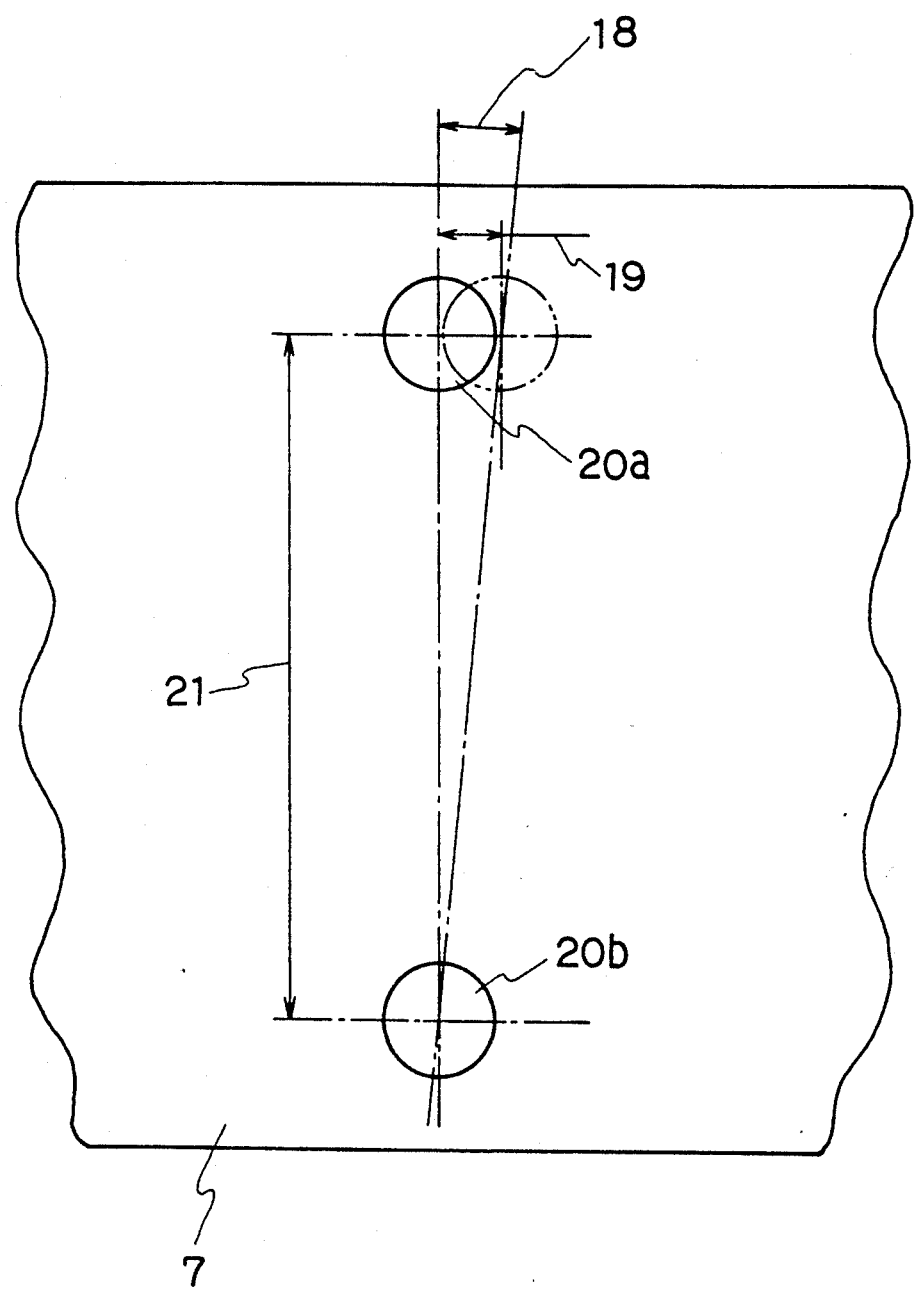
FIG. 7 is a schematic view explaining the pivotal instability.

FIG. 7 is a schematic view explaining the pivotal instability, in which the pivotal instability (x/span) is represented by the numeral 18, the lateral deflection (x) of one sliding member is represented by the numeral 19, sliding members are represented by the numerals 20a, 20b and the span between two sliding members is represented by the numeral 21 respectively. In order to simplify the drawing, the sliding members 20a, 20b are illustrated by circles.

Furthermore, by employing another construction as shown in FIG. 2 wherein protrusions 4a, 4b, 5a, 5b are provided on the side guided surfaces (side face) 2c, 2d in addition to the construction shown in FIG. 1, an instability (a play) in back and forth directions (directions represented by the arrows A and B in FIG. 3) can also be removed.

Figure 3:
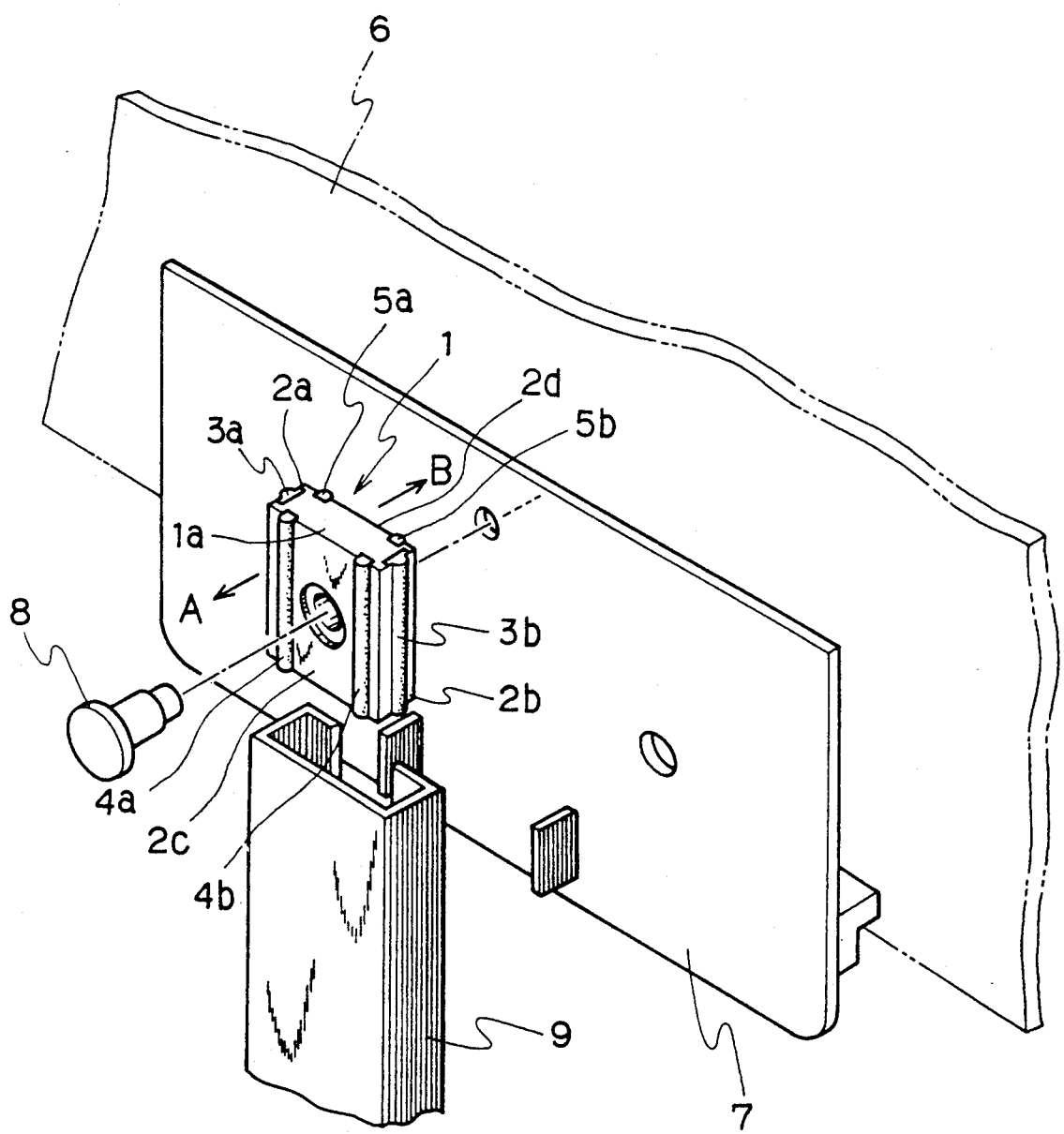
FIG. 3 is a schematic exploded perspective view of a window regulator showing an application of the slidable member according to the present invention.

In FIG. 3, the numeral 6 represents a window pane, the numeral 7 represents a carrier plate, the numeral 8 represents a shaft to attach the sliding member 1 to the carrier plate 7, and the numeral 9 represents a guide rail.

Figure 4:
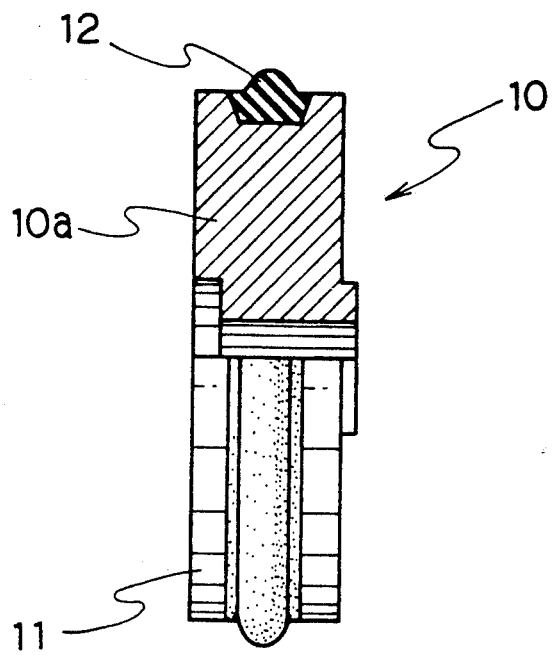
FIG. 4 is a partially cutaway view showing an another embodiment of the sliding member having a side face of round shape according to the present invention.
Figure 5:
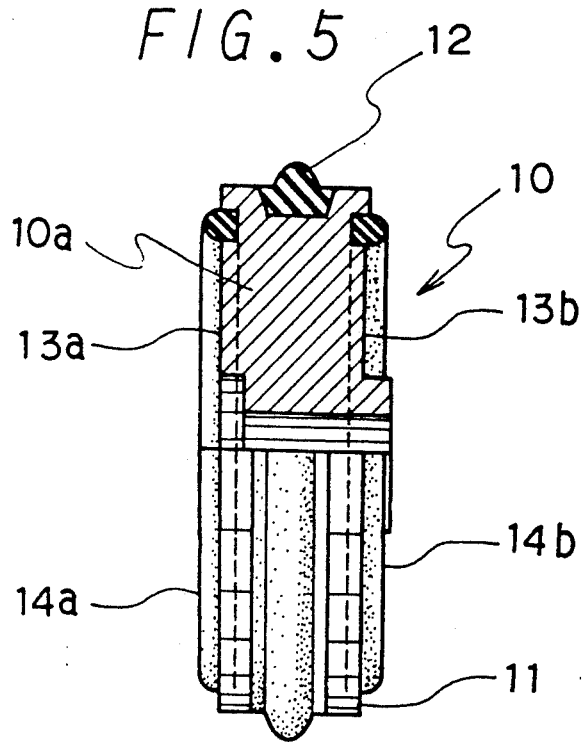
FIG. 5 is a partially cutaway view showing another embodiment of a round sliding member different from the embodiment shown in FIG. 4.

Next, in the case that a roller-like, or round shaped, sliding member 10 is employed as shown in FIG. 4 and FIG. 5, the same advantageous result can be obtained by employing a construction in which an annular protrusion 12 made of elastic material slidably contacting the guide rail is provided on a part of the outside circumferential surface 11 of the rigid body 10a, or optionally a construction in which ring-like protrusions 14a, 14b are provided on side faces 13a, 13b.

Thus, each of the previously-mentioned advantages of the conventional sliding member made of relatively hard material and the conventional sliding member made of relatively hard but elastic material such as polyurethane makes up for the drawbacks of the other, and as a result, pivotal instability of the carrier plate during the sliding movement of the window pane can be greatly minimized.

It should be noted that the protrusions of the sliding member are not limited to protrusions having a continuous form as shown in FIG. 1 and FIG. 2, but a number of discontinuous local protrusions are also included within the principle of the present invention.

As described hereinbefore, the sliding member for a window regulator according to the present invention can bring an advantageous effect that a pivotal instability at the initial sliding movement is suppressed to a minimum and another pivotal instability caused by undesired deformation under a heavy load is also suppressed to a minimum.

What we claim is:

1. A sliding member for a window regulator, the window regulator comprising:
   a substantially vertical guide rail having a lip channel type cross sectional shape, said guide rail having a first inner surface, a second and a third inner surface perpendicular to said first inner surface and extending respectively from right and left ends of said first inner surfaces to face each other, a fourth and a fifth inner surface parallel with said first inner surface and extending inwardly respectively from extended ends of said second and said third inner surfaces,
   a sliding member capable of sliding along an inside of the guide rail, and
   a carrier plate having a shaft supporting the sliding member and fixedly supporting a window pane, said carrier plate being capable of sliding up and down along the guide rail,
   characterized in that the sliding member has a rigid body having five guided areas respectively guided by said first inner surface, said second inner surface, said third inner surface, said fourth inner surface and said fifth inner surface of said guide rail and a protrusion made of elastic material is provided on a part of each of said five guided areas, each of said protrusions being located in such a manner that under light load conditions said protrusions prevent said rigid body from sliding directly on said inner surfaces of said guide rail and under heavy load conditions said rigid body is allowed to slide directly on said inner surfaces of said guide rail.

2. The sliding member of claim 1, wherein the sliding member has rectangular side faces.

3. The sliding member of claim 1, wherein the sliding member has opposed round-shaped side faces, a continuous annular protrusion is provided on a part of an outside circumferential surface of the sliding member and covers the full circumferential length of said outside circumferential surface and a ring shaped protrusion is provided on each of said opposed round-shaped side faces.

* * * * *